3,573,936
PLICATIC ACID AND THIODIPROPIONIC ACID AS ANTIOXIDANTS FOR USE IN ANIMAL FATS AND VEGETABLE OILS
Arthur Karchmar, Clifton, N.J., and Kevin L. McDonald, Vancouver, British Columbia, Canada, assignors to Rayonier Incorporated, New York, N.Y.
No Drawing. Filed Dec. 15, 1967, Ser. No. 690,755
Int. Cl. A23b 1/12
U.S. Cl. 99—163     7 Claims

ABSTRACT OF THE DISCLOSURE

A mixture of plicatic acid and thiodipropionic acid exhibits a synergistic antioxidant effect when added to animal fats and vegetable oils and foodstuffs containing these materials. The plicatic acid-thiodipropionic acid additive, which comprises substantially equal amounts of each component, greatly increases the storage life of fats and oils when added thereto in amounts approximating 100 parts per million.

BACKGROUND OF THE INVENTION

(I) Field of the invention

This invention relates to a method for substantially retarding the rate of auto-oxidation and the concomitant rancidity associated with animal fats and vegetable oils and foodstuffs containing these materials. In particular, it relates to the addition to said fats and oils of an effective amount of an antioxidant comprising a mixture of plicatic acid and thiodipropionic acid in substantially equal amounts. This antioxidant combination is effective at both ambient temperature and at high temperature (190° C.) which makes it particularly suitable in certain food processing operations.

(II) Description of the prior art

Animal fats and vegetable oils and foodstuffs containing these materials exhibit a natural tendency to become rancid upon standing at ambient temperatures for various periods of time due to auto-oxidation. The objectionable flavors and odors that are thereby produced make these natural products unsuited for human consumption. In addition, the oxidation process diminishes the nutritional value of these products through the destruction of vitamins and essential fatty acids.

Antioxidants, by acting as preferential oxygen acceptors, retard the process of auto-oxidation and, therefore, increase the storage life of the food product. Since these antioxidants are to be added to edible products for human consumption, they must be relatively non-toxic at normal dose levels, and must not impart any flavor or odor of their own to the foodstuff.

Various compounds have been utilized as antioxidants in foodstuffs including butylated hydroxy toluene (BHT), butylated hydroxy anisole (BHA), propyl gallate (PG) and nordihydroguaiaretic acid (NDGA). These compounds have not been wholly satisfactory for a variety of reasons among which are their high cost, toxicity and lack of "carry-through" in which the inhibitory action of the anti-oxidant is carried over into the finished food product as, for example, into baked goods. Furthermore, the use of BHA and BHT is restricted in the United States and is prohibited in some European countries. Propyl gallate (PG), which is used in most commercial lards and safflower oils in conjunction with BHT and BHA, is a powerful anti-oxidant, but has the disadvantage of producing objectionable blue or green colors in foods in the presence of iron or copper and small amounts of moisture.

The use of thiodipropionic acid (TDPA) as an antioxidant is known, but it is considered as being relatively ineffective as an antioxidant in animal fats and vegetable oils. With plicatic acid, however, it is a highly effective antioxidant in animal fats and vegetable oils.

Plicatic acid (see structural formula hereinbelow) is one of the components of the complex mixture of phenolic compounds occurring in the aqueous extract of western red cedar wood (thuja plicata). The identification of plicatic acid and a process for extracting it from red cedar wood with aqueous solvents are described in two articles entitled, "The Polyphenols of Western Red Cedar" by Gardner, Barton and MacLean, Can. J. Chem., vol. 37, 1703–9 (1959) and "The Chemistry and Utilization of Western Red Cedar," by Dr. J. A. F. Gardner, Department of Forestry, Publication No. 1023 (1963), Department of Forestry, Canada. At page 1705 of the former article, Gardner suggests that plicatic acid be tested for possible antioxidant properties.

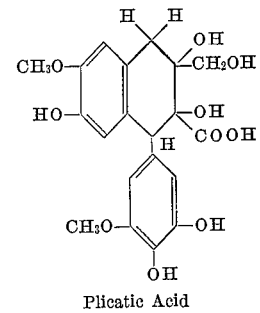

Plicatic Acid

It is known that groups of various antioxidants when added to foodstuffs as a mixture are more effective than when certain antioxidants have been used alone. This is to be expected because of the increase in the total amount of antioxidant used. Common antioxidant additive mixtures are, for example, a commercially common mixture of BHT+BHA+PG and BHT+BHA.

SUMMARY OF THE INVENTION

The present invention is based on the discovery that a mixture of plicatic acid and thiodipropionic acid (TDPA) exhibits exceptionally good antioxidant properties when used in conjunction with animal fats and vegetable oils and foodstuffs containing these materials. Broadly stated, this invention comprises a method for substantially retarding the rate of auto-oxidation in animal fats and vegetable oils which comprises adding to said fats and oils an effective amount of a mixture of plicatic acid and thiodipropionic acid (TDPA) in substantially equal amounts. The combination of plicatic acid and TDPA exhibits a synergistic antioxidant effect with the result that the combination of the two compounds, when used as an additive in fats and oils and natural food products containing these materials, produces a far greater antioxidant effect than would normally be expected from either one of these compounds alone. This is surprising in view of the fact that TDPA alone is relatively ineffective as an antioxidant in fats and oils.

DESCRIPTION OF THE PREFERRED PRACTICE OF THE INVENTION

We have found that plicatic acid, in amounts as small as from about 50 to about 150 parts per million, is a powerful antioxidant for use in animal fats and vegetable oils and foodstuffs containing these materials. When it is added to these materials in combination with a substantially equal amount of TDPA, its effectiveness is greatly increased.

EXPERIMENTAL

For purposes of the study, the samples of fats and oils selected were free of antioxidants; commercial lard and oils of the same type containing antioxidants were used as sub-controls. BHT and BHA combined and NDGA alone were introduced in antioxidant-free fat and oil for a straight comparison with plicatic acid.

A total of 54 samples of lard and oils was weighed into 150 ml. beakers. A total of 54 samples of the various antioxidants was weighed, all in the same concentration of 0.01% based on the weight of lard or oil. Wherever a combination of two antioxidants was used (BHT+BHA) or an antioxidant and a synergist (plicatic acid+TDPA) respectively, each compound was weighed to represent 50 p.p.m. or a total of 100. The antioxidants were weighed into micro-beakers, dissolved in a small quantity of absolute ethanol, and transferred quantitatively into the lard and oils. The latter were then slightly heated to evaporate the ethanol and placed in the air-aerated oven at 57° C. (±2). All samples in beakers were mixed with glass rods twice a day to permit an even exposure of oils and fats to the oven temperature.

Table I represents the effect of various antioxidant additives in a sample of fresh lard as measured by its peroxide value (a measure of its oxidation) at 450 hours. It will be seen that the plicatic acid plus TDPA antioxidant additive was the most effective antioxidant tested. Generally, the plicatic acid is used in amounts of from 50 to 150 p.p.m. More or less plicatic acid, however, can be used if desired. Concentrations of plicatic acid below 20 p.p.m. are relatively ineffective, however, while it is soluble in oils to a concentration of the order of 150 p.p.m. Preferably, the ratio of TDPA to plicatic acid will vary from about 1 to 10 to about 1 to 0.5.

TABLE I.—SAMPLE [1]

| Compound | Time (hrs.) | Peroxide test, me. per 1,000 g. |
|---|---|---|
| Plicatic acid, pure | 450 | 32.5 |
| Plicatic acid, crude | 450 | 40.5 |
| BHT plus BHA | 450 | 47.5 |
| NDGA | 450 | 37.5 |
| Plicatic acid plus TDPA | 450 | 17.5 |
| Commercial (lard containing BHT plus BHA plus PG) | 450 | 25.0 |

[1] Lard (fresh, deodorized) (initial peroxide value, 0.5 me. per 1,000 g).

Table II represents the effect of various antioxidant additives in a simple of safflower oil at 400 hours as measured by its peroxide value. Here again, the plicatic acid plus TDPA was the best antioxidant of the group.

TABLE II.—SAMPLE [1]

| Compound | Time (hrs.) | Peroxide test, me. per 1,000 g. |
|---|---|---|
| Plicatic acid, pure | 400 | 67.5 |
| Plicatic acid, crude | 400 | 68.5 |
| BHT plus BHA | 400 | 82.5 |
| NDGA | 400 | 73.0 |
| Plicatic acid plus TDPA | 400 | 57.5 |
| Commercial oil (containing BHT plus BHA plus PG [2] plus PG [3] plus citric acid) | 400 | 70.0 |

[1] Oil (safflower, fresh).
[2] Propyl gallate.
[3] Propylene glycol.

The results of these experiments confirm that the plicatic acid is a more potent antioxidant than the combination of BHT and BHA and is about equivalent to NDGA in activity.

The purified plicatic acid (nearly white in appearance), as compared to the crude type, shows only slightly higher antioxidant activity which suggests that, unless there is an objection to its brown color, the purification of the crude plicatic acid may not be necessary.

The combination of plicatic acid and TDPA was the best antioxidant additive of the group tested. This is due to the synergistic effect which TDPA exerts on plicatic acid, it being previously noted that TDPA alone does not have an appreciable effect in retarding oxidation in these materials. It is contemplated that the percentage amounts of the various ingredients can be varied to suit any particular situation as the need arises.

While the invention has been described hereinabove in terms of a limited number of examples of the process and product thereof, the invention itself is not limited thereto, but rather comprehends all modifications of and departures from those examples falling within the spirit and scope of the appended claims.

We claim:
1. A method for substantially retarding the rate of auto-oxidation in animal fats and vegetable oils and foodstuffs containing these materials which comprises adding to said fats and oils and foodstuffs a mixture of plicatic acid and thiodipropionic acid containing at least 20 parts per million plicatic acid, in an amount sufficient to retard auto-oxidation of said fats and oils and foodstuffs.

2. A method for substantially retarding the rate of auto-oxidation in animal fats and vegetable oils and foodstuffs containing these materials which comprises adding to said fats and oils and foodstuffs a mixture of plicatic acid and thiodipropionic acid in which the amount of plicatic acid used in about 50–150 parts per million and the ratio of thiodipropionic acid to plicatic acid is such that for each part of thiodipropionic acid used from about 0.5 to 10 parts of plicatic acid are used.

3. The method according to claim 2 in which said plicatic acid and thiodipropionic acid are added in substantially equal amounts.

4. The method according to claim 3 in which the plicatic acid and thiodipropionic acid are each in the amount of 50 parts per million.

5. An antioxidant for use in animal fats and vegetable oils and foodstuffs containing these materials, said antioxidant comprising an admixture of plicatic acid and thiodipropionic acid in a ratio of each effective to synergistically retard the rate of auto-oxidation of said fats, oils and foodstuffs when added thereto, and containing at least about 20 parts per million plicatic acid.

6. An antioxidant for use in combination with animal fats and vegetable oils and foodstuffs, said antioxidant comprising an admixture of plicatic acid and thiodipropionic acid in which the ratio of thiodipropionic acid to plicatic acid is between about 1 to 10 to about 1 to 0.5.

7. The antioxidant of claim 6 in which the ratio of thiodipropionic acid to plicatic acid is about 1 to 1.

References Cited

UNITED STATES PATENTS

| | | | |
|---|---|---|---|
| 2,333,658 | 11/1943 | Mattill et al. | 260—398.5 |
| 2,334,564 | 11/1943 | Lewis | 252—404 |
| 2,373,192 | 4/1945 | Lauer | 99—163 |
| 2,569,122 | 9/1951 | Adelson | 99—163A.O. |
| 2,721,804 | 10/1955 | Rosenwald | 99—163 |
| 3,156,728 | 11/1964 | Orloff et al. | 260—578 |
| 3,390,098 | 6/1968 | Van Ness | 252—404 |

OTHER REFERENCES

Bakers Digest, April 1956 (pp. 48–53 and pp. 68 and 71) copy in 99/A.O. Lit.

Canadian J. of Chem., vol. 37 (1959), pp. 1703–05.

WILBUR L. BASCOMB, Jr., Primary Examiner
F. E. DRUMMOND, Assistant Examiner

U.S. Cl. X.R.
252—404; 260—398.5